US008162235B2

(12) United States Patent
McAfee

(10) Patent No.: US 8,162,235 B2
(45) Date of Patent: Apr. 24, 2012

(54) IRRIGATION DEVICE

(75) Inventor: Michael Albert McAfee, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 29 days.

(21) Appl. No.: 12/555,473

(22) Filed: Sep. 8, 2009

(65) Prior Publication Data

US 2011/0057048 A1 Mar. 10, 2011

(51) Int. Cl.
*B05B 15/10* (2006.01)
*B05B 15/02* (2006.01)
*F16J 15/32* (2006.01)

(52) U.S. Cl. .......................... 239/206; 239/114; 239/205

(58) Field of Classification Search .................... 239/11, 239/104, 114, 115, 200, 203–206; 277/549, 277/550
See application file for complete search history.

(56) References Cited

U.S. PATENT DOCUMENTS

| | | | | |
|---|---|---|---|---|
| 4,316,579 | A * | 2/1982 | Ray et al. | 239/123 |
| 4,625,914 | A | 12/1986 | Sexton et al. | |
| 4,787,558 | A | 11/1988 | Sexton et al. | |
| 4,834,289 | A * | 5/1989 | Hunter | 239/205 |
| 4,932,590 | A * | 6/1990 | Hunter | 239/222.17 |
| 5,086,977 | A * | 2/1992 | Kah, Jr. | 239/205 |
| 5,383,600 | A | 1/1995 | Verbera et al. | |
| 5,423,486 | A * | 6/1995 | Hunter | 239/205 |
| 5,779,148 | A * | 7/1998 | Saarem et al. | 239/104 |
| 6,478,237 | B2 * | 11/2002 | Kearby et al. | 239/232 |
| 6,732,950 | B2 | 5/2004 | Ingham, Jr. et al. | |
| 6,929,194 | B2 | 8/2005 | Lawson | |

OTHER PUBLICATIONS

Webpage RainBird 1800-PRS Series Spray Heads (http://www.rainbird.com/landscape/products/sprayBodies/1800PRS.htm), 2 pages. This product was publicly disclosed at least one year prior to the filing date of the above identified application.

Webpage RainBird 1800-SAM Series Spray Heads (http://www.rainbird.com/landscape/products/sprayBodies/1800SAM.htm), 2 pages. This product was publicly disclosed at least one year prior to the filing date of the above identified application.

Webpage RainBird 1800-SAM-PRS Series Spray Heads (http://www.rainbird.com/landscape/products/sprayBodies/1800SAM_PRS.htm), 2 pages. This product was publicly disclosed at least one year prior to the filing date of the above identified application.

(Continued)

*Primary Examiner* — Darren W Gorman

(74) *Attorney, Agent, or Firm* — Fitch, Even, Tabin & Flannery, LLP

(57) ABSTRACT

An irrigation sprinkler is provided having a housing and a riser assembly for the distribution of irrigation water that includes a wiper seal to prevent bypass flow. The sprinkler includes a first flow path that delivers water to a nozzle for irrigation and a second flow path that delivers water to a cavity between the riser assembly and the housing. The water in the cavity is substantially prevented from exiting the cavity because of an annular wiper blade and a secondary sealing blade that substantially contact the riser assembly through the riser assembly's reciprocal movement between retracted and elevated positions. The water in the cavity is additionally prevented from exiting the cavity due to a primary sealing blade that substantially contacts the riser assembly for a limited period of time when the riser assembly is in the elevated position. By limiting the period of time in which the primary sealing blade contacts the riser assembly, the primary sealing blade experiences less friction and seal degradation during reciprocation.

18 Claims, 8 Drawing Sheets

OTHER PUBLICATIONS

Webpage ProPlus RCW (http://www.krain.com/index.cfm?fuseaction=wastewater.onsite&CFID=222289412&CFTOKEN=50097590), 2 pages. This product was publicly disclosed at least one year prior to the filing date of the above identified application.

Webpage "Reclaimed Water Products" (http://www.hunterindustries.com/Products/Miscellaneous/reclaimed?water.html), 2 pages. This product was publicly disclosed at least one year prior to the filing date of the above identified application.

Webpage RainBird US NP Cover—Non-Potable 1800 Series Cover (http://www.rainbird.com/landscape/products/sprayBodies/US_NPcover.htm), 1 page. This product was publicly disclosed at least one year prior to the filing date of the above identified application.

Webpage RainBird 1800 NP Cover—Non-Potable 1800 Series Cover (http://www.rainbird.com/landscape/products/sprayBodies/1800NPcover.htm), 1 page. This product was publicly disclosed at least one year prior to the filing date of the above identified application.

Webpage RainBird 1800 VPC Vandal Proof Cap (http://www.rainbird.com/landscape/products/sprayBodies/1800VPC/htm), 1 page. This product was publicly disclosed at least one year prior to the filing date of the above identified application.

Webpage RainBird 1800 Series—Pop-up Spray Head Sprinklers (http://www.rainbird.com/homeowner/products/sprays/1800.htm), 1 page. This product was publicly disclosed at least one year prior to the filing date of the above identified application.

Webpage RainBird 1800 Series—Spray Head (http://www.rainbird.com/documents/turf/ts_1800Series.pdf), 4 pages. This product was publicly disclosed at least one year prior to the filing date of the above identified application.

Webpage RainBird 3500 Series Rotors (http://www.rainbird.com/documents/turf/ts_3500Series.pdf), 2 pages. This product was publicly disclosed at least one year prior to the filing date of the above identified application.

Webpage RainBird 5000 Plus Series Rotors (http://www.rainbird.com/documents/turf/ts_5000Plus.pdf), 4 pages. This product was publicly disclosed at least one year prior to the filing date of the above identified application.

Webpage RainBird 5000/5000 Plus PRS Series Rotors (http://www.rainbird.com/documents/turf/ts_5000Plus-PRS.pdf), 4 pages. This product was publicly disclosed at least one year prior to the filing date of the above identified application.

Webpage RainBird 5000 Series Rotors (http://www.rainbird.com/documents/turf/ts_5000Series.pdf), 4 pages. This product was publicly disclosed at least one year prior to the filing date of the above identified application.

Webpage RainBird 5500 Series Rotors (http://www.rainbird.com/documents/turf/ts_5500Series.pdf), 6 pages. This product was publicly disclosed at least one year prior to the filing date of the above identified application.

Webpage RainBird Falcon 6504 Rotors (http://www.rainbird.com/documents/turf/ts_Falcon_6504.pdf), 4 pages. This product was publicly disclosed at least one year prior to the filing date of the above identified application.

Webpage RainBird 8005 Rotor (http://www.rainbird.com/documents/turf/ts_8005_Rotor.pdf), 4 pages. This product was publicly disclosed at least one year prior to the filing date of the above identified application.

Webpage RainBird 7005 Rotor (http://www.rainbird.com/documents/turf/ts_7005_Rotor.pdf), 4 pages. This product was publicly disclosed at least one year prior to the filing date of the above identified application.

Cross-section of wiper seal and a portions of a corresponding housing and riser of Rain Bird 6504 and 7005 series rotors, which were public at least one year prior to the filing date of the above-identified application.

Cross-section of wiper seal and a portion of a corresponding housing and riser representative of that in the Rain Bird 8005 series rotors, which were public at least one year prior to filing date of the above-identified application.

* cited by examiner

IRRIGATION DEVICE

FIELD OF THE INVENTION

This invention relates to irrigation devices and, more particularly, to a sealing device for pop-up irrigation sprinklers.

BACKGROUND OF THE INVENTION

Pop-up irrigation sprinklers are typically buried in the ground and include a stationary housing and a riser assembly, mounted within the housing, that cycles up and down during an irrigation cycle. During an irrigation cycle, the riser assembly is propelled through an open upper end of the housing and projects above ground level, or "pops up," to distribute water to surrounding terrain. More specifically, pressurized water is supplied to the sprinkler through a water supply line attached to an inlet of the housing. The pressurized water causes the riser assembly to travel upwards against the bias of a spring to the elevated spraying position above the sprinkler housing to distribute water to surrounding terrain through one or more spray nozzles. When the irrigation cycle is completed, the pressurized water supply is shut off and the riser is spring-retracted back into the sprinkler housing so that the housing and riser assembly are again at and below ground level.

A rotary sprinkler commonly includes a rotatable turret mounted at the upper end of the riser assembly. The turret includes one or more spray nozzles for distributing water and is rotated through an adjustable arcuate water distribution pattern. There are also other types of pop-up sprinklers that operate without the rotating turret.

Rotary sprinklers commonly include a water-driven motor to transfer energy of the incoming water into a source of power to rotate the turret. One common mechanism uses a water-driven turbine and a gear reduction system to convert the high speed rotation of the turbine into relatively low speed turret rotation. Some examples of rotary sprinklers include the sprinklers described in U.S. Pat. Nos. 4,625,914; 4,787,558; 5,383,600; 6,732,950; and 6,929,194; all assigned to the assignee of this application, Rain Bird Corporation.

During normal operation, the riser reciprocates within the stationary housing as water pressure in the supply line increases and decreases. When the water pressure is low, a spring biases the riser down. When water pressure increases, the water pressure overcomes the spring bias and the riser pops up. Except for when the riser is translating, the riser position is usually in one of two positions: fully extended or fully retracted.

Rotary sprinklers commonly employ a wiper seal within the housing that engages an outer surface of the riser. When the sprinkler is in the off position, an annular wiper blade disposed at ground level prevents grit and dirt from entering the housing. When the sprinkler is in the on position, the annular wiper blade continues to engage the outer surface. As the riser retracts, the annular wiper blade scrapes debris from the outer surface of the riser. Additionally, the annular wiper blade prevents water from exiting between the riser and a cover attached to the housing, and also prevents water from leaking where the cover engages the housing, thus conserving water.

Prior designs of the wiper seal included the annular wiper blade disposed at the top of the housing, and a sealing blade disposed within the housing. The annular wiper blade primarily operates to prevent grit from entering the housing, while the sealing blade controls bypass flow. Bypass flow is water that does not exit the sprinkler through the nozzle but, rather, exits the sprinkler from the gap between the wiper seal and the riser assembly. When the riser is fully elevated, the sealing blade contacts a flared end of the riser, creating a water-tight seal and substantially preventing bypass flow from exiting the cavity. However, before the riser assembly is fully elevated, there is an insufficient seal to prevent bypass flow.

The annular wiper blade of the prior designs has an interior diameter that is approximately equal to the outside diameter of the riser, but it does not create a tight seal in order to allow the riser assembly to reciprocate within the housing. As the riser reciprocates in and out of the housing when the sprinkler turns off and on, respectively, friction is created between the annular wiper blade and the riser assembly. Over time, the annular wiper blade wears down because of the repeated friction. The sealing blade of prior designs has an interior diameter that is slightly larger than outer diameter of the riser assembly, and seals against the flared end of the riser assembly when the riser assembly is fully extracted. Before sealing, however, the gap between the sealing blade and the riser assembly allows a high amount of bypass flow. Repeated sealing and unsealing between the sealing blade and the riser contributes to the sealing blade wearing down over time.

As the annular wiper blade and sealing blade wear down, it increases the area between the riser and the wiper seal. This increases the amount of bypass flow that occurs, which allows any grit that has managed to enter the cavity to be pulled up and toward the wiper seal. This can result in the grit becoming lodged between the wiper seal and the riser. Excess grit and debris in this area further contributes to the bypass flow problem by preventing the sealing blade from properly sealing against the riser. This can create relatively large leaks and also can prevent the sprinkler from retracting if too much grit is lodged between the wiper seal and the riser. The grit can also permanently damage the wiper seal causing additional leaks. Leaks result in water loss across the irrigation network. Limiting water loss is important as water resources are becoming more limited and restrictions on water use are increasing.

When the bypass flow increases, additional water pressure is necessary to overcome the spring bias. Over time, this can result in complete failure of the sprinkler to pop up when the water pressure is not high enough to overcome the spring bias. Additionally, exemplary irrigation systems include a plurality of sprinklers disposed along the water supply line. If too many sprinklers allow bypass flow to exit the cavity, other sprinklers on the system may not receive adequate inlet pressure to overcome the spring bias, even when they are not suffering the bypass flow problem.

Therefore, there is a need for a pop-up sprinkler device that prevents bypass flow. Further, there is a need for a wiper seal that is more resistant to wear after repeated reciprocation of the riser, that prevents leaking to conserve water, and that fully extracts and retracts with high reliability.

DESCRIPTION OF THE PREFERRED EMBODIMENTS

Figure 1:
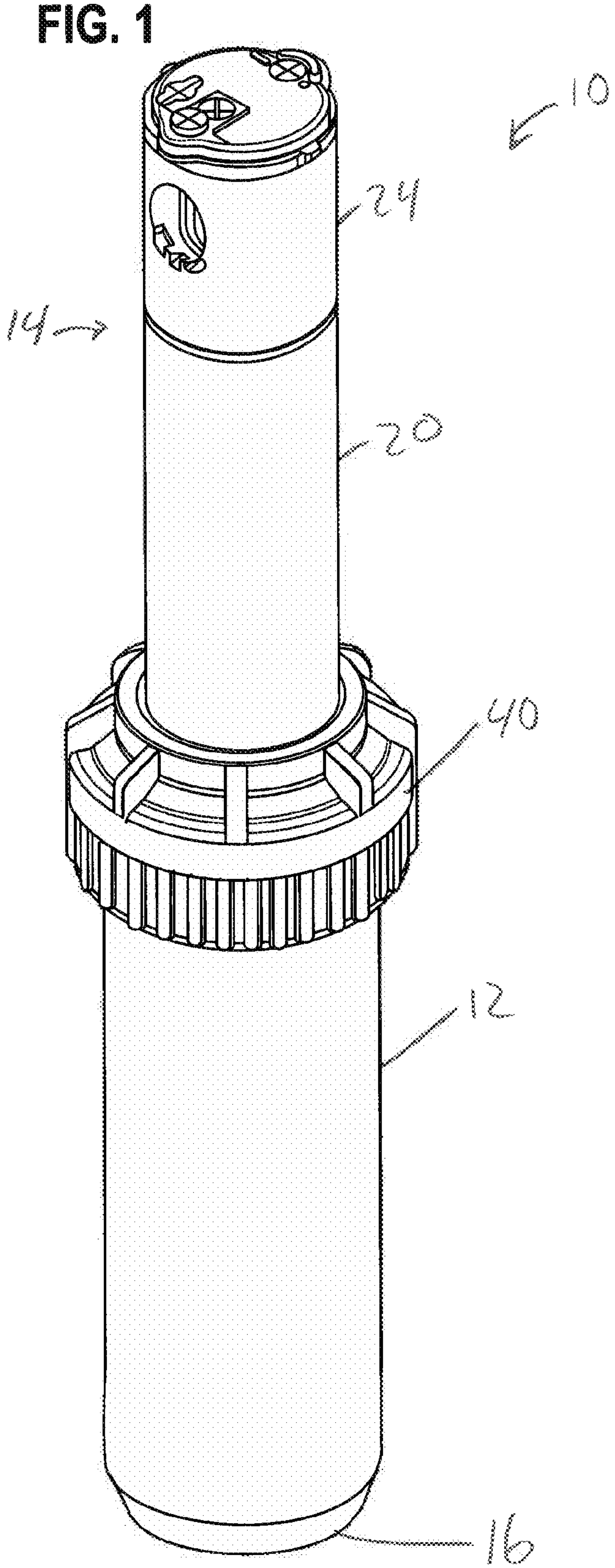
FIG. 1 is a perspective view of an irrigation sprinkler embodying features of the present invention with a riser assembly in an elevated position for distributing water therefrom.
Figure 2:
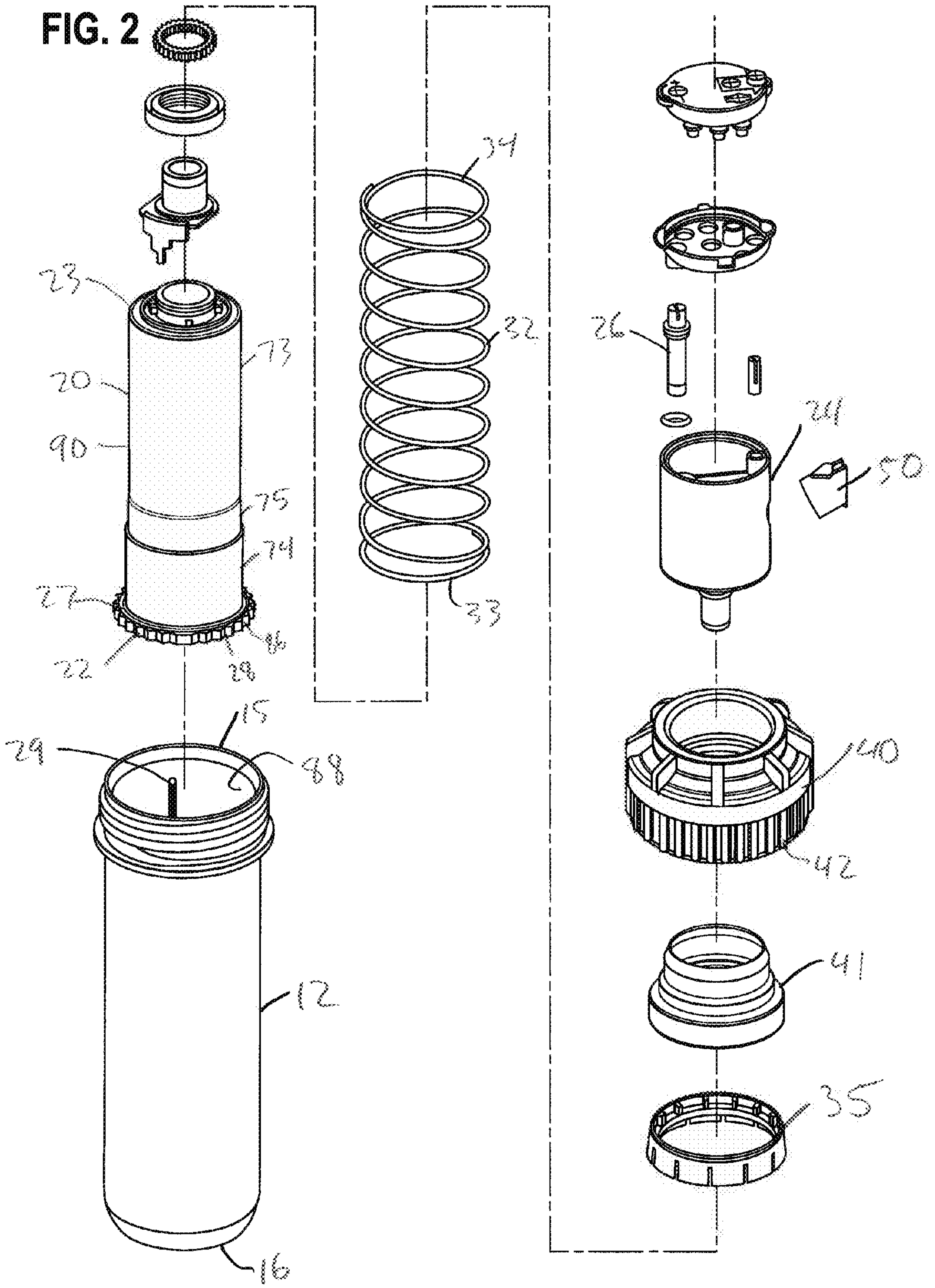
FIG. 2 is an exploded perspective view of some of the components of the irrigation sprinkler of FIG. 1.
Figure 3:
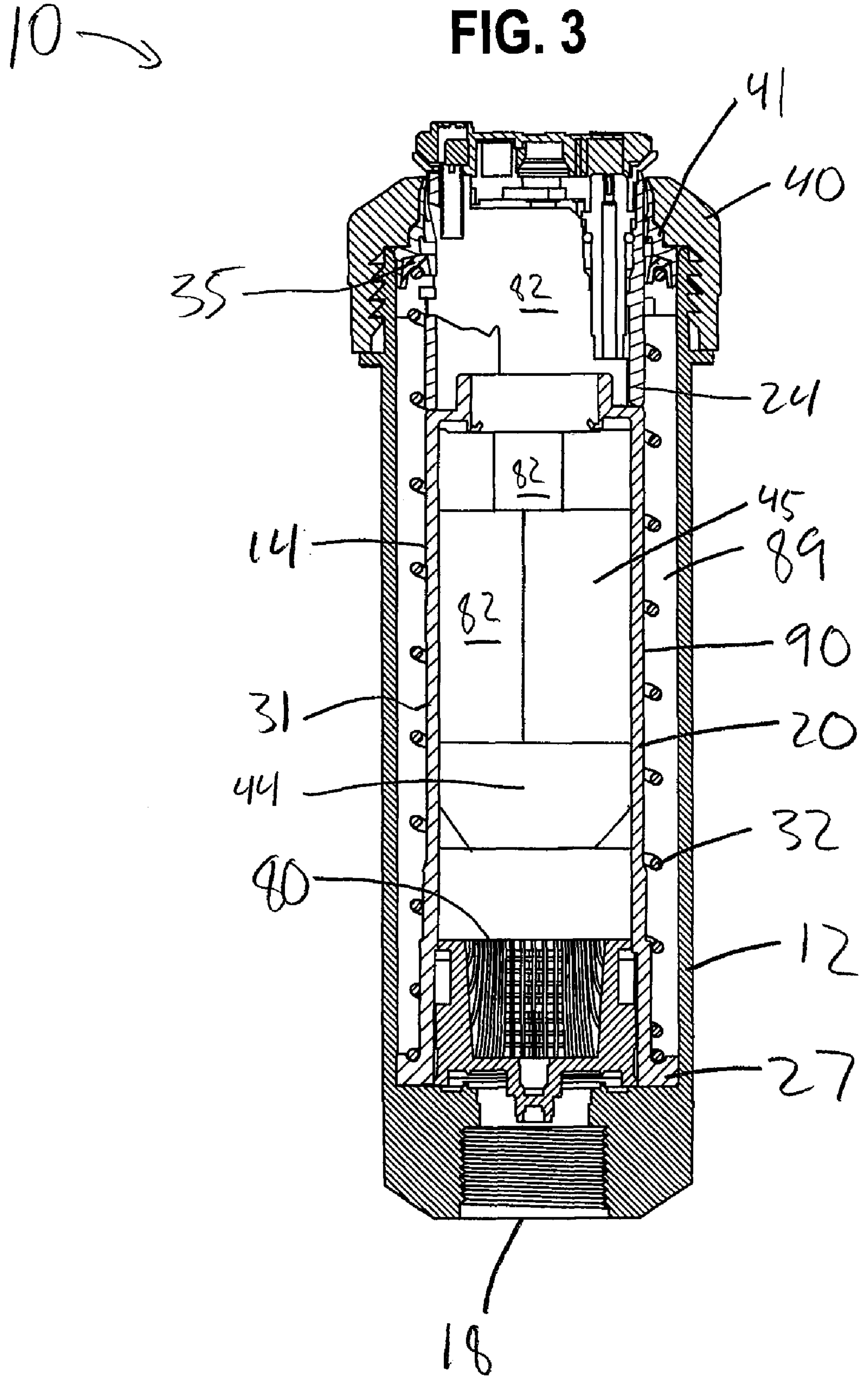
FIG. 3 is a side elevational cross-sectional view of the irrigation sprinkler of FIG. 1 with the riser assembly in a retracted position.
Figure 4:
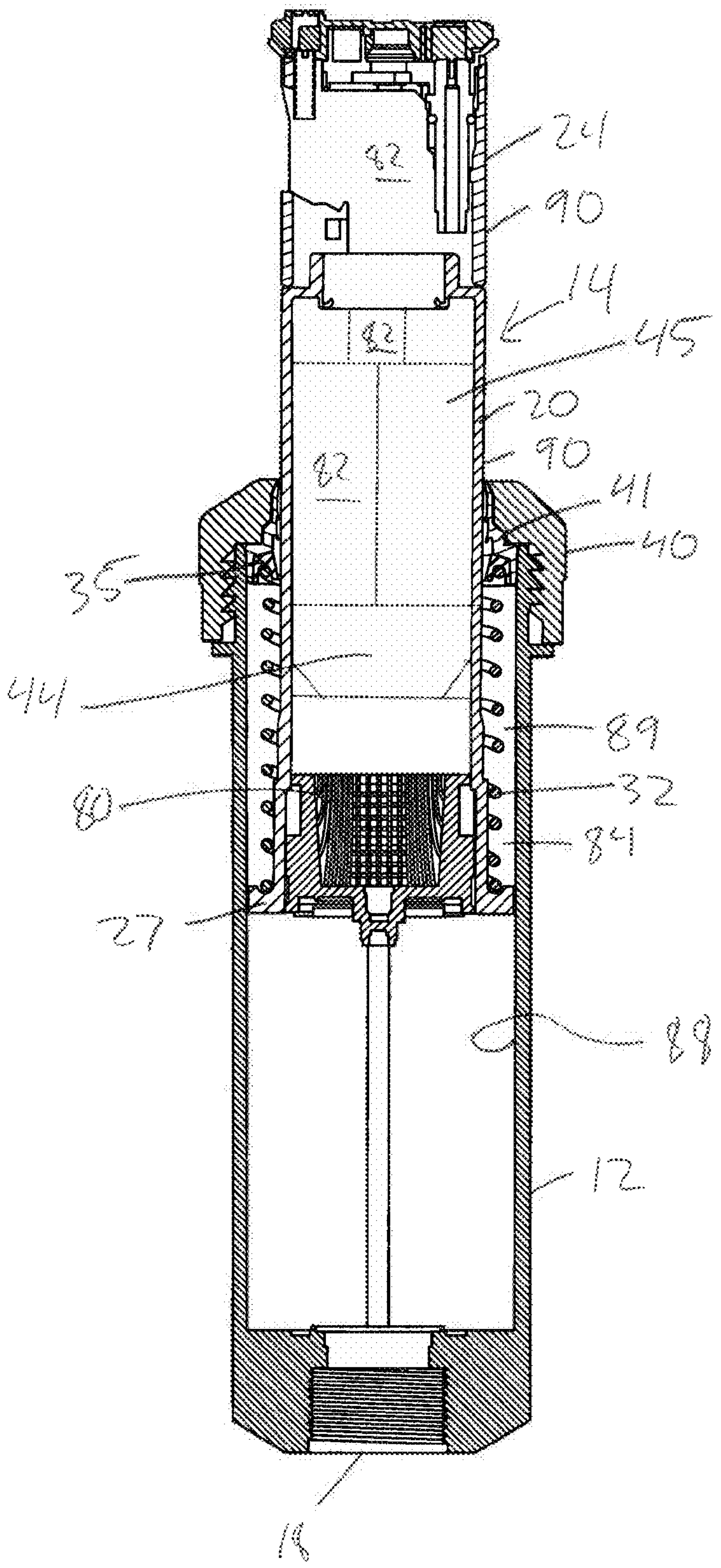
FIG. 4 is a side elevational cross-sectional view of the irrigation sprinkler of FIG. 1 with the riser assembly in an intermediate position between the retracted position and the elevated position.
Figure 5:
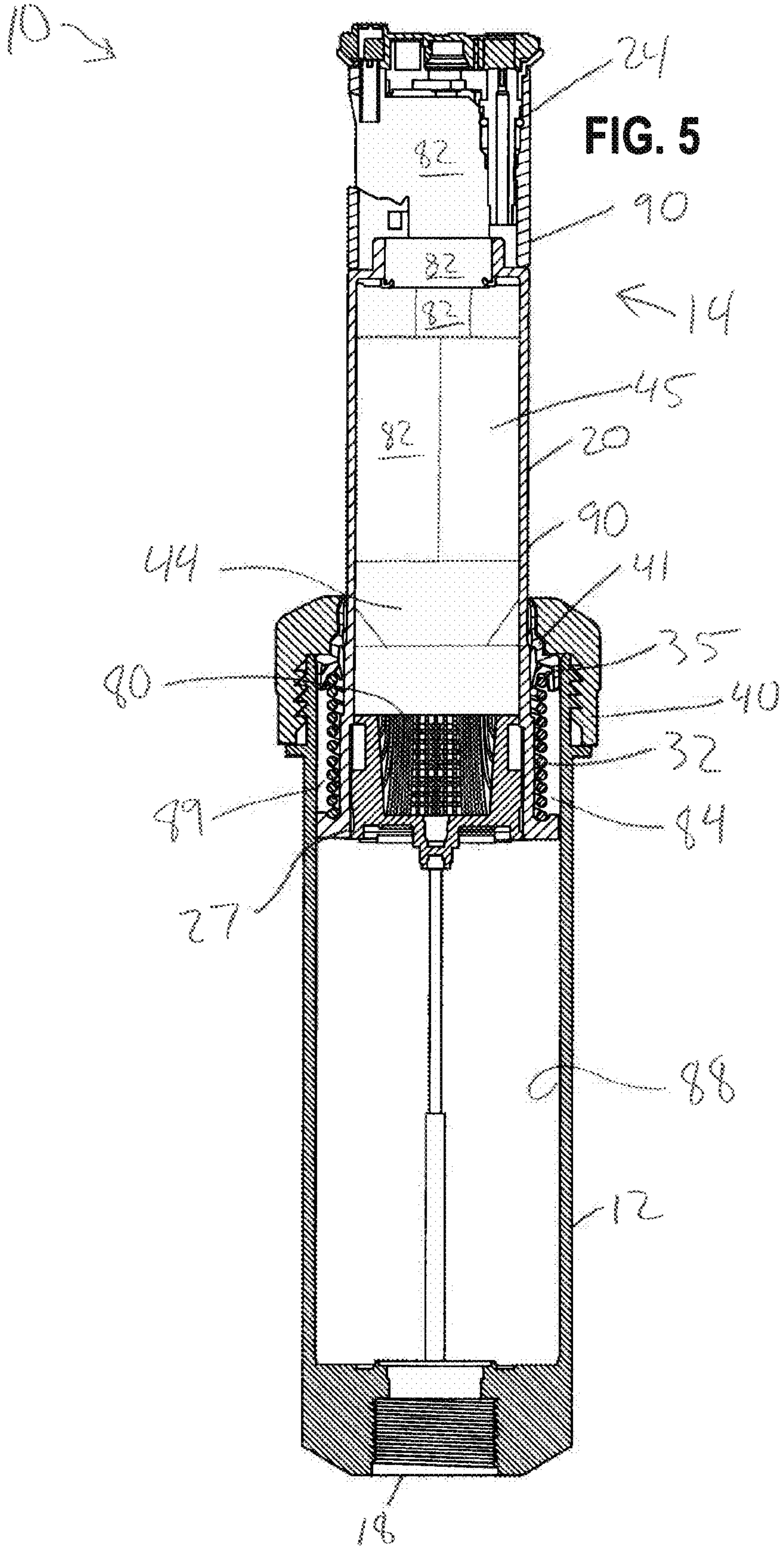
FIG. 5 is a side elevational cross-sectional view of the irrigation sprinkler of FIG. 1 with the riser assembly in the elevated position.

As shown in FIGS. 1-5, a rotary pop-up sprinkler 10 is provided having a housing 12 and a riser assembly 14. The riser assembly 14 reciprocates between a spring-retracted position, as shown in FIG. 3, and an elevated watering position, as shown in FIGS. 1 and 5, in response to water pressure. More specifically, when the supply water is on, i.e., pressurized for a watering cycle, the riser assembly 14 extends ("pops up") above ground level so that water can be distributed to the surrounding terrain for irrigation. When the water is shut off at the end of a watering cycle, the riser assembly 14 retracts into the housing 12 where it is protected from damage.

The housing 12 provides a protective covering for the riser assembly 14 and serves as a conduit for incoming water under pressure. The housing 12 preferably has the general shape of a cylindrical tube and is preferably made of a sturdy lightweight injection molded plastic or similar material. The housing 12 has an upper end 15 and a lower end 16 defining an inlet 18 that is threaded to connect to a correspondingly threaded outlet of a water supply pipe (not shown); however, other attachment formats are also possible. The sprinkler 10 may be one of a plurality of coordinated sprinklers 10 in an irrigation network.

Figure 12:
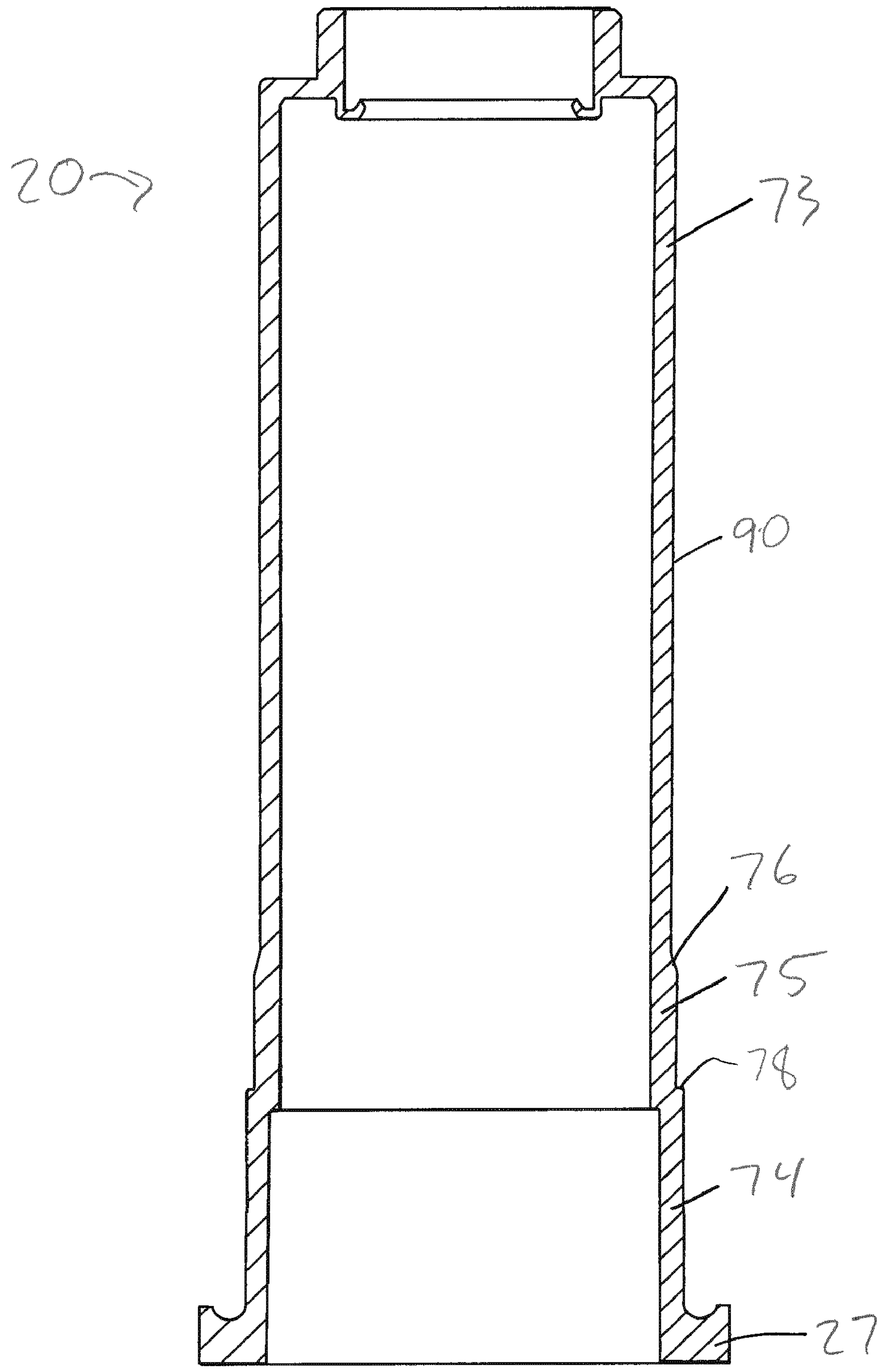
FIG. 12 is an elevational cross-sectional view of a stem of the riser assembly of the irrigation sprinkler of FIG. 1.

The riser assembly 14 includes a non-rotatable stem 20, shown in FIGS. 2 and 12, with a lower end 22 and an upper end 23. A rotatable turret 24, shown in FIG. 2, is mounted on the upper end 23 of the stem 20. The turret 24 rotates relative to the housing 12 and the stem 20 to water a predetermined arcuate pattern manually adjustable from generally 0 degrees to 360 degrees. The sprinkler 10 includes a reversing gear drive mechanism 25, shown generally in FIG. 3, at the interface between the turret 24 and the stem 20 that switches the direction of rotation of the turret 24 to create the desired arcuate sweep or, in some cases, permits the turret 24 to continue in a single direction for 360 degree watering. An arc adjustment member 26 allows one to manually adjust the arcuate sweep settings.

The stem 20 is generally an elongated hollow tube, which is preferably made of a lightweight molded plastic or similar material. The lower end 22 includes a radially projecting annular flange 27. The flange 27 preferably includes a plurality of circumferentially spaced grooves 28 that cooperate with at least one internal rib 29 of the housing 12 to prevent the stem 20 from rotating relative to the housing 12. A coil spring 32 for retracting the riser assembly 14 is disposed in the housing 12 about the outside surface 31 of the riser assembly 14. The spring 32 has a bottom coil 33 that engages the flange 27 and an upper coil 34. The upper coil 34 engages an underside of a spring support ring 35.

The housing cover 40 serves, in part, to minimize the introduction of dirt and other debris into the housing 12. The housing cover 40 also serves to restrain the riser assembly 14 from exiting the housing 12 when the sprinkler is on and the riser assembly 14 has translated to the extended position. The housing cover 40 preferably has internal threads and is mounted to the upper end 15 of the housing 12 which has corresponding threads. The housing cover 40 also preferably includes a grippable external surface that preferably includes a plurality of vertically extending ribs 42 for enhanced gripping and easy mounting of the sprinkler 10 to a water supply pipe outlet.

The housing cover 40 engages a wiper seal 41 that engages the support ring 35. More specifically, the support ring 35 engages the upper coil 34 of the spring 32, which ensures that the wiper seal 41 remains substantially engaged with the housing cover 40. The wiper seal 41 also engages the housing 12. This engagement between the wiper seal 41, on the one hand, and the housing 12 and the housing cover 40, on the other hand, prevents water from leaking between the housing 12 and the housing cover 40. The wiper seal 41 also serves to prevent the introduction of dirt and other debris into the housing 12.

A drive assembly 43, illustrated generally in FIGS. 3-5, is mounted within the stem 20 and rotates the turret 24. The water pressure supplied to the sprinkler 10 preferably provides the power for rotationally driving the turret 24, although other conventional ways of providing power to the turret 24 may be used. The drive assembly 43 preferably includes a water driven turbine 44 and a gear reduction assembly 45 which are operatively coupled to rotate the turret 24. The turret 24 includes a water discharge outlet preferably fitted with a removable nozzle 50 for providing the pressurized water to the surrounding terrain.

Figure 6:
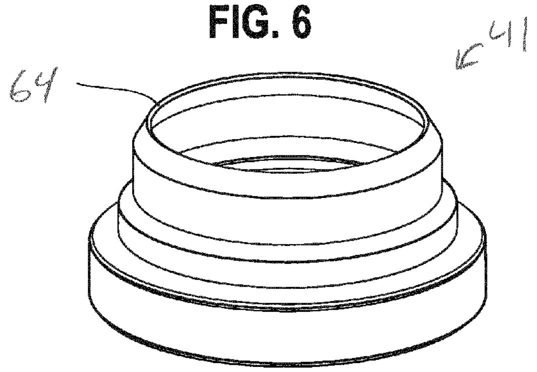
FIG. 6 is a perspective view of a wiper seal of the irrigation sprinkler of FIG. 1.
Figure 7:
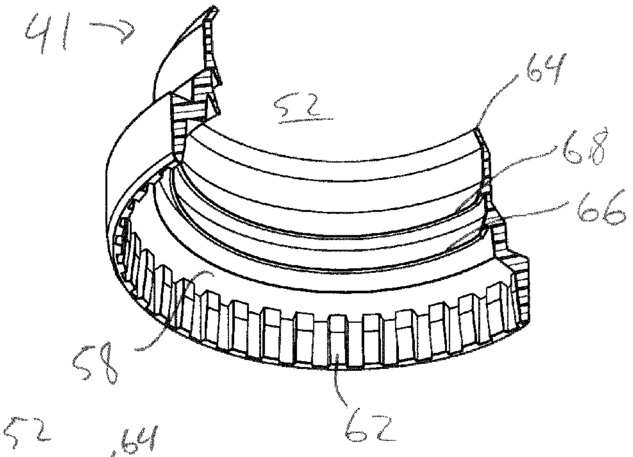
FIG. 7 is a perspective cross-sectional view of the wiper seal of FIG. 6.
Figure 8:
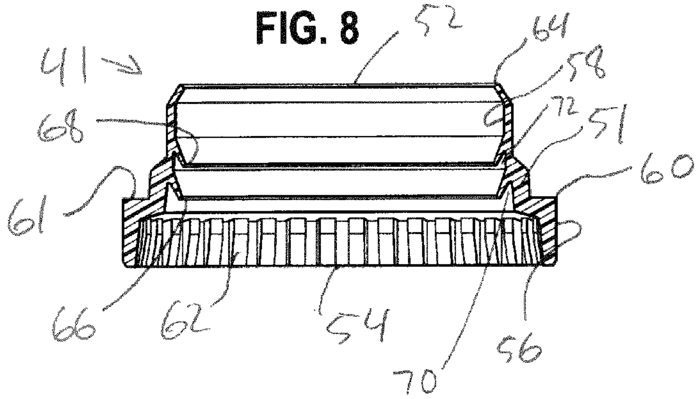
FIG. 8 is an elevational cross-sectional view of the wiper seal of FIG. 6.

As shown in FIGS. 6-8, the wiper seal 41 has a generally annular shape having a central axis and is preferably made of rubber or other flexible and resilient material. The wiper seal 41 includes a sidewall 51 having various diameters at different points along the central axis. The wiper seal 41 further includes a cover opening 52 and a support ring opening 54. The wiper seal 41 has an outer surface 56 and an inner surface 58. When assembled, the outer surface 56 contacts an internal surface of the housing cover 40. The wiper seal 41 further includes an annular step 60 having an annular outer surface 61 that is generally perpendicular to the central axis of the wiper seal 41. A plurality of tapered ribs 62 protrude radially from the inner surface 58. The ribs 62 are circumferentially disposed at the support ring opening 54 about the central axis of the wiper seal 41 and aid the support ring 35 in seating the wiper seal 41 against the cover 40 and the housing 12.

An annular blade 64 defines the cover opening 52, wherein the inner diameter of the annular blade 64 increases along the central axis in the direction of the support ring opening 54. A primary sealing blade 66 having an annular shape extends from the inner surface 58 of the wiper seal 41. The inner diameter of the primary sealing blade 66 increases along the central axis in the direction of the cover opening 52. A secondary sealing blade 68 having an annular shape also extends from the inner surface 58 of the wiper seal 41. The secondary sealing blade 68 is disposed between the annular blade 64 and the primary sealing blade 66. Similar to the primary sealing blade 66, the inner diameter of the secondary sealing blade 68 increases along the central axis in the direction of the cover opening 52.

The primary sealing blade 66 and the inner surface 58 define a primary sealing cavity 70. The secondary sealing blade 68 and the inner surface 58 define a secondary sealing cavity 72.

As described above, the riser assembly 14 includes the stem 20 and the turret 24. The stem 20 and turret 24 are designed to interact with the wiper seal 41 at different periods of operation. As shown in FIGS. 2 and 12, the stem 20 includes three longitudinal portions: a distal portion 73, a proximal portion 74, and an intermediate portion 75. The distal portion 73 is adjacent the turret 24; the proximal portion 74 is adjacent the flange 27; and the intermediate portion 75 is disposed between the distal portion 73 and the proximal portion 74. The outer diameter of the turret 24 is generally equivalent to the distal portion 73. The distal portion 73, the proximal portion 74, and intermediate portion 75 each have a generally cylindrical outer surface. The outer diameter of the proximal portion 74 is greater than the outer diameter of the intermediate portion 75, and the outer diameter of the intermediate portion 75 is greater than the outer diameter of distal portion 73.

The transition from the intermediate portion 75 to the distal portion 73 is in the form of a tapered portion 76. The transition from the proximal portion 74 to the intermediate portion 75 is generally in the form of an annular step 78.

During normal operation, water enters the housing 12 through the inlet 18 and passes through the housing 12 to the riser assembly 14. The water passes through a filter 80 mounted within the lower end 22 of the stem 20. The filter 80 prevents grit and other debris from entering the riser assembly 14 and possibly causing damage to sensitive components downstream of the filter 80.

Water generally flows through the filter 80 and through the turbine 44, which rotates at a high rate of speed. The turbine 44 is operatively connected to the gear reduction assembly 45. The gear reduction assembly 45 couples the turbine 44 to the turret 24 and reduces the rotation speed so that the turret 24 rotates at a much lower rate. After flowing past the turbine 44, water continues to flow through sprinkler 10 toward the nozzle 50. The gear reduction assembly 45 engages the reversing drive mechanism 25. The reversing drive mechanism 25 includes a first trip stop (not shown) which is adjustable by the arc adjustment member 26 relative to a second trip stop (not shown). The positioning of the first trip stop sets the range of rotation for the turret 24. The reversing drive mechanism 25 also includes a trip arm (not shown). The reversing drive mechanism 25 operates to rotate the turret 24 in one rotational direction and, upon reaching the point set by the arc adjustment member 26, the first trip stop or second trip stop engages the trip arm, which causes the turret 24 to rotate back in the other direction. This reciprocal rotation continues back and forth during the irrigation period. While the operation of sprinkler 10 including the stem 20 and turret 24 has been described in general terms, the function of the stem 20 and the turret 24 is well know in the art, and other methods of operation for transferring the pressurized fluid to the outlet would also suffice. While the preferred embodiment includes the use of pop-up rotary sprinklers, the function of the wiper seal 41 and the riser assembly 14, described herein, is not limited to pop-up rotary sprinklers but may be used with other sprinkler designs employing a pop-up feature.

As water enters the sprinkler 10, pressure buildup within the riser assembly 14 forces the riser assembly 14 to overcome the bias of spring 32. As water flows into the riser assembly 14 and the riser assembly 14 begins to translate to an elevated position, water flows along two flow paths. A first flow path 82 is through the lower end 22 of the stem 20, through the riser assembly 14 including the stem 24, and out through the nozzle 50 to distribute water to surrounding terrain.

A second flow path 84 is within the housing 12 but outside the stem 20. More specifically, water first flows through a first gap 86 defined by the grooves 28 of the flange 27 of the riser assembly 14 (FIG. 2) and an inner surface 88 of the housing 12. Water then flows into and fills an annular cavity 89 in which the spring 32 is located, which is generally defined by an outer surface 90 of the riser assembly 14, the inner surface 88 of the housing 12, and the wiper seal 41. The water in the annular cavity 89 flows toward the wiper seal 41. Water that flows toward the wiper seal 41 can escape the annular cavity 89 if there is a gap between the wiper seal 41 and the riser assembly 14. The wiper seal 41 seals against the housing 12 and prevents water from exiting between the housing 12 and the housing cover 40.

The wiper seal 41 interacts with the riser assembly 14 in generally four different conditions. The first condition is when the water pressure in the system is off and the riser assembly 14 is retracted. The second condition is when the water pressure is on, and the riser assembly 14 is translating toward the elevated position. The third condition is when the riser assembly 14 is in the elevated position. The fourth condition is when the water pressure has been shut off, and the riser assembly 14 is returning from the elevated position to the retracted position.

Figure 9:
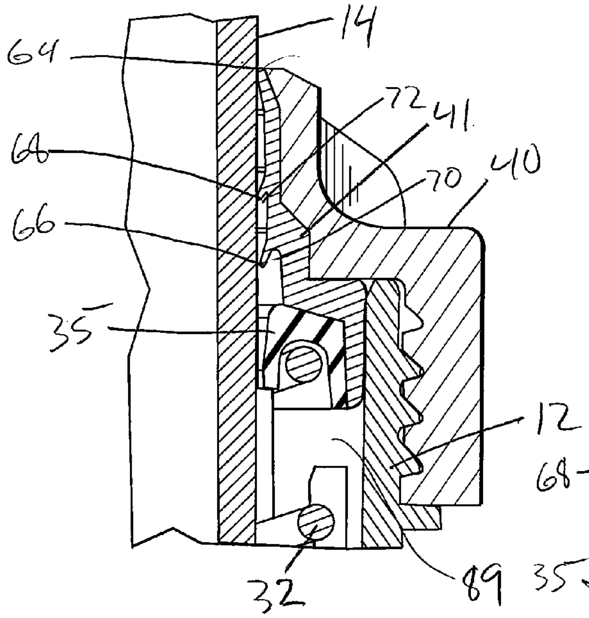
FIG. 9 is a partial cross-sectional view of the irrigation sprinkler of FIG. 1 showing a first operational condition.

The first condition is shown in FIGS. 3 and 9. In this condition, the inner diameter of the annular blade 64 is approximately equal to the outer diameter of the riser assembly 14. While the riser assembly 14 is retracted, the annular blade 64 prevents dirt and other debris from entering the housing 12. The inner diameter of the secondary sealing blade 68 is also approximately equal to the outer diameter of the riser assembly 14, although there could possibly be some interference between them. The inner diameter of the primary sealing blade 66 is greater than the outer diameter of the riser assembly 14. Therefore, in this condition, the annular blade 64 and the secondary sealing blade 68 are in contact with the riser assembly 14, while the primary sealing blade 66 is not in contact. During this condition, any water in the annular cavity 89 is under minimal, if any, pressure. For example, any such water pressure is insufficient to overcome the bias of the spring 32.

Figure 10:
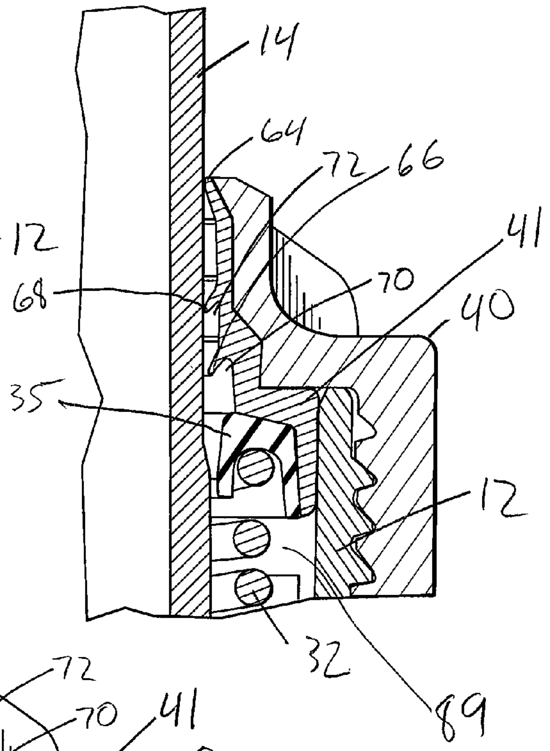
FIG. 10 is a partial cross-sectional view of the irrigation sprinkler of FIG. 1 showing a second operational condition.

The second condition is illustrated in FIGS. 4 and 10, wherein the riser assembly 14 is translating from the retracted position to the elevated position. Similar to the first condition, the annular blade 64 and the secondary sealing blade 68 are in contact with the riser assembly 14. The primary sealing blade 66 is not in contact with the riser assembly 14 during this condition. During this condition, water is flowing through the sprinkler 10 and, specifically, into the annular cavity 89. The water flows past the primary sealing blade 66, but is substantially prevented from flowing past the secondary sealing blade 68 due to the contact between the secondary sealing blade 68 and the riser assembly 14. As explained further below, the water pressurizes the secondary sealing cavity 72, forcing the secondary sealing blade 68 into further sealing engagement with either the turret 24 or the distal portion 73 of the stem 20, depending on how far the riser assembly 14 has translated. Thus, there is redundancy in sealing. This reduces the amount of water that exits the annular cavity 89 during this operating condition and preserves the water pressure buildup in the sprinkler 10.

Figure 11:
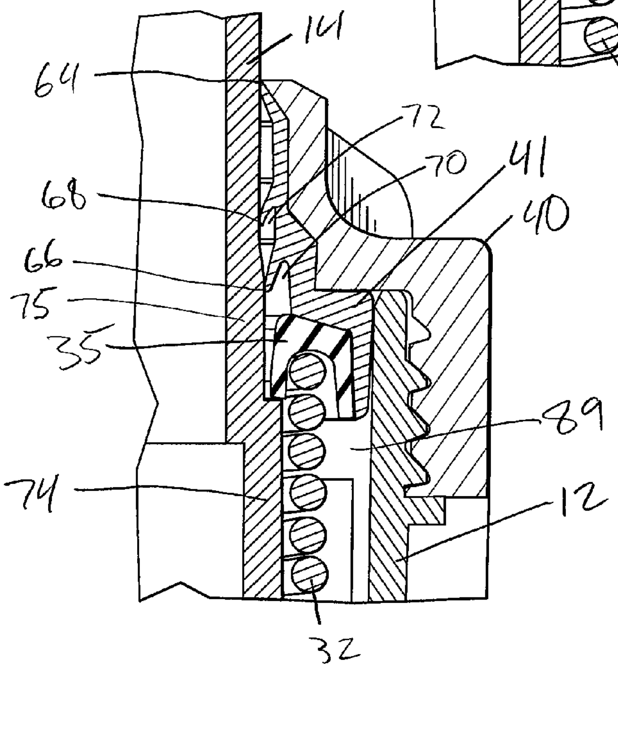
FIG. 11 is a partial cross-sectional view of the irrigation sprinkler of FIG. 1 showing a third operational condition.

The third condition is shown in FIGS. 5 and 11, wherein the riser assembly 14 is in the fully elevated position. In this condition, the annular blade 64 and the secondary sealing blade 68 remain in contact with the distal portion 73 of the stem 20. However, in this condition, the primary sealing blade 66 also contacts the riser assembly 14 at the intermediate portion 75 of the stem 20. The inner diameter of the primary sealing blade 66 is approximately equal to, or slightly smaller than, the outer diameter of the intermediate portion 75. During this condition, the sprinkler 10 is fully functioning, and water pressure is flowing through the sprinkler 10. Water is also present in the annular cavity 89, but it does not flow through the cavity 89 because there is no exit. Due to the contact between the primary sealing blade 66 and the intermediate portion 75, water is substantially prevented, if not completely, from flowing past the primary sealing blade 66. Any water that does happen to flow past the primary sealing blade 66 is further blocked by the secondary sealing blade 68, which is in contact with the riser assembly 14. This redundant sealing prevents water from leaking out of the annular cavity 89 at the annular blade 64, thus preserving the water pressure within the system and ensuring the continued operation of the sprinkler 10. This water pressure in the primary sealing cavity 70 forces the primary sealing blade 66 into further sealing engagement with the intermediate portion 75 of the stem 20, as explained further below.

The fourth condition, illustrated in FIGS. 4 and 10, is similar to the second condition except that the riser assembly 14 is returning to the retracted position. During this condition, the water pressure within the sprinkler 10 is decreasing and the spring 32 is operating to retract the riser assembly 14 back into the housing 12. As the riser assembly 14 retracts, the contact between the annular blade 64 and the riser assembly 14 removes any dirt or debris that has accumulated on the riser assembly 14 during operation.

An exemplary sprinkler system experiences repeated watering cycles. During these cycles, the water pressure in the supply line increases and decreases to activate and deactivate the system, respectively. During this repeated operation, the riser assembly 14 reciprocates within the housing 12. This reciprocation results in friction between the wiper seal 41 and the riser assembly 14. Over time, repeated contact between the riser assembly 14 and the wiper seal 41 can result in the deterioration of the wiper seal 41. The wiper seal 41 can also deteriorate due to debris that makes contact with the wiper seal 41.

In the preferred embodiment, the riser assembly 14 is in constant contact with the annular blade 64 and the secondary sealing blade 68. However, the primary sealing blade 66 is only in contact with the riser assembly 14 when the riser assembly 14 is in the extracted position because the outer diameter of the riser assembly 14 is less than the inner diameter of the primary sealing blade 66. Only when the intermediate portion 75 of the riser assembly 14 has translated far enough toward to the extracted position does the primary sealing blade 66 engage the riser assembly 14. As such, the primary sealing blade 66 is in contact with the stem 20 for a relatively short period of time during the reciprocation of the riser assembly 14. This shortened period of friction substantially reduces the amount of wear on the primary sealing blade 66, extending the functional life of the wiper seal 41 and, ultimately, the sprinkler 10 as a whole.

Even in the event that friction wears down the primary sealing blade 66 or secondary sealing blade 68, resulting in a small gap between the riser assembly 14 and the primary sealing blade 66 or the secondary sealing blade 68, they remain capable of substantially restricting water from exiting the annular cavity 89. As stated above, the wiper seal 41 is made from a flexible resilient material. Therefore, the primary sealing blade 66 and the secondary sealing blade 68 are capable of flexibly deforming under pressure. The annular blade 64, while made of the same material, is substantially restricted from flexing due to its position against the cover 40.

As water pressure accumulates within the annular cavity 89, the water accumulates in the primary sealing cavity 70 and the secondary sealing cavity 72. The water pressure in the primary sealing cavity 70 and the secondary sealing cavity 72 is greater than the pressure on the opposite side of the primary sealing blade 66 and the secondary sealing blade 68, respectively, which causes the primary sealing blade 66 and the secondary sealing blade 68 to deflect toward the riser assembly 14. This pressure activation ensures that the wiper seal 41 will continue to function even in the event that a gap is formed between the riser assembly 14 and the wiper seal 41 due to wear.

During the second operating condition described above, the riser assembly 14 is translating toward the elevated position, but it has not yet fully elevated. A common problem with pop-up sprinklers during this operating condition is bypass flow, which would be fluid that exits from the annular cavity 89. The larger the gap between the wiper seal 41 and the riser assembly 14, the higher the amount of bypass flow that exists. During normal operation, grit and debris in the supply line, often caused by improper installation or line breaks, can enter the sprinkler 10. The filter 80 operates to prevent the grit and debris from entering the first flow path 82, but grit and debris that is blocked by the filter 80 can still flow into the annular cavity 89. When high bypass flow exists, this can cause the grit and debris to be dragged up and lodged between the wiper seal 41 and the riser assembly 14. This lodging usually occurs at the edges of the primary sealing blade 66 and the secondary sealing blade 68 where they are nearest the riser assembly 14. However, because the secondary sealing blade 68 is in constant contact with the outer diameter of the riser assembly 14, the amount of bypass flow is significantly limited. Therefore, grit and debris are not dragged toward the wiper seal 41 because of the limited bypass flow. In the event that grit and debris do happen to become lodged between the wiper seal 41 and the riser assembly 14, the pressure actuated sealing of the primary sealing blade 66 and the secondary sealing blade 68, described above, limits the amount of bypass flow caused by this lodging. This also limits any leaking when the riser assembly 14 is in the extended position. By limiting the bypass flow and limiting leaking, water resources are conserved and the irrigation network operates more reliably.

The constant contact between the secondary sealing blade 68 and the riser assembly 14, coupled with the redundancy of the primary sealing blade 66 and the secondary sealing blade 68 during the fully extracted operating condition, ensures that there is a minimal amount of bypass flow. By reducing bypass flow, water pressure throughout the system can remain higher, which ensures continued operation of individual sprinklers 10, as well as other sprinklers 10 disposed along the irrigation network. Additionally, the limited contact between the primary sealing blade 66 and the riser assembly 14 reduces friction on the primary sealing blade 66 during operation, thus extending the functional life of the primary sealing blade 66 and the sprinkler 10 as a whole.

The foregoing relates to preferred exemplary embodiments of the invention. It is understood that other embodiments and variants are possible which lie within the spirit and scope of the invention as set forth in the following claims.

What is claimed is:

1. An irrigation sprinkler comprising:

a housing with an inlet for receiving pressurized fluid for irrigation;

a riser mounted to the housing, the riser comprising an outlet for expelling pressurized fluid for irrigation;

the riser being capable of reciprocal movement between a retracted position and an elevated position relative to the housing, the riser having a generally cylindrical shape including an increased diameter portion;

a wiper seal mounted to the housing, the wiper seal comprising at least a first protruding annular blade, a second protruding annular blade, and a third protruding annular blade;

the riser and the housing defining at least in part a first conduit for pressurized fluid flow for irrigation;

the riser, the housing, and the wiper seal defining at least in part a first cavity for receiving pressurized fluid flow;

wherein the first annular blade and the second annular blade are substantially in contact with the riser throughout the reciprocal movement and do not contact the increased diameter portion; and wherein the third annular blade sealingly engages the increased diameter portion of the riser only when the riser is in the elevated position.

2. The irrigation sprinkler of claim 1 wherein the third annular blade does not contact the riser with a sealing engagement when the riser is in the retracted position.

3. The irrigation sprinkler of claim 1 wherein the wiper seal is made of a flexible and resilient material.

4. The irrigation sprinkler of claim 3 wherein the second annular blade and the third annular blade are capable of deforming toward the riser in response to pressurized flow.

5. The irrigation sprinkler of claim 1 wherein the housing comprises a removable cover.

6. The irrigation sprinkler of claim 5 wherein the wiper seal is disposed between the cover and the riser.

7. The irrigation sprinkler of claim 1 wherein the riser comprises a stem portion and a turret portion, wherein the turret portion comprises the outlet and is capable of rotational movement relative to the stem portion.

8. The irrigation sprinkler of claim 1 wherein the riser comprises a flange having a crenellated surface.

9. The irrigation sprinkler of claim 8 further comprising a spring disposed within the housing, the spring being biased against the flange and the wiper seal.

10. The irrigation sprinkler of claim 9 further comprising a support ring disposed between the spring and the wiper seal.

11. The irrigation sprinkler of claim 1 wherein the riser engages the housing to substantially restrict fluid from flowing into the first cavity when the riser is in the retracted position.

12. The irrigation sprinkler of claim 1 wherein the third annular blade does not contact the riser to thereby permit fluid to flow past the third annular when the riser is translating between the retracted and elevated positions, and wherein the second annular blade being substantially in contact with the riser substantially restricts fluid from flowing past the second annular blade when the riser is translating between the retracted and elevated position.

13. The irrigation sprinkler of claim 1 wherein fluid is substantially restricted from flowing past both the second and third annular blade when the riser is in the elevated position.

14. The irrigation sprinkler of claim 1 wherein the first annular blade operates to remove any particulate matter from the riser when the riser is translating toward the retracted position.

15. A method for providing irrigation water comprising the steps of:

providing a housing having comprising an inlet for receiving pressurized fluid flow;

providing a riser within the housing, the riser having a generally cylindrical shape including an increased diameter portion and having an outlet for expelling pressurized fluid and being capable of reciprocal movement between a retracted position and an elevated position;

providing a wiper seal disposed between the housing and the riser, the wiper seal comprising a first annular blade for preventing debris from entering the housing, a second annular blade for preventing pressurized fluid from exiting the housing throughout the reciprocal movement, and a third annular blade for preventing fluid from exiting the housing when the riser is elevated;

wherein the riser, the housing, and the wiper seal define at least in part a first cavity for receiving pressurized fluid flow;

wherein the first annular blade and the second annular blade are substantially in contact with the riser throughout the reciprocal movement and do not contact the increased diameter portion; and transmitting pressurized fluid from the inlet to the outlet through a first flow path defined by the housing and the riser such that the pressurized fluid forces the riser toward an elevated position, wherein the third annular blade sealingly engages the increased diameter portion of the riser only when the riser is in the elevated position.

16. The method of claim 15 further comprising the step of providing a spring disposed within the housing for biasing the riser toward the retracted position.

17. The method of claim 15 wherein the wiper seal is made from a flexible and resilient material.

18. The method of claim 17, wherein the wiper seal is capable of deforming toward the riser in response to a buildup of the pressurized fluid at the wiper seal.

* * * * *

UNITED STATES PATENT AND TRADEMARK OFFICE

CERTIFICATE OF CORRECTION

PATENT NO. : 8,162,235 B2
APPLICATION NO. : 12/555473
DATED : April 24, 2012
INVENTOR(S) : Michael Albert McAfee It is certified that error appears in the above-identified patent and that said Letters Patent is hereby corrected as shown below:

IN THE CLAIMS:

Column 9, line 51, in claim 12, after “annular” and before “when” insert --blade--.

Signed and Sealed this
Fifth Day of May, 2015

Michelle K. Lee

Michelle K. Lee
*Director of the United States Patent and Trademark Office*